(12) United States Patent
Boskovic (10) Patent No.: US 8,488,164 B2
(45) Date of Patent: Jul. 16, 2013

(54) MOBILE PRINTING SOLUTION

(75) Inventor: Srdjan Boskovic, Heidelberg (DE)

(73) Assignee: SAP AG, Walldorf (DE)

( * ) Notice: Subject to any disclaimer, the term of this patent is extended or adjusted under 35 U.S.C. 154(b) by 409 days.

(21) Appl. No.: 12/856,282

(22) Filed: Aug. 13, 2010

(65) Prior Publication Data

US 2012/0038940 A1 Feb. 16, 2012

(51) Int. Cl.
*G06F 3/12* (2006.01)
*G06K 15/00* (2006.01)

(52) U.S. Cl.
USPC ........ 358/1.15; 358/1.13; 358/1.16; 358/1.18

(58) Field of Classification Search
None
See application file for complete search history.

(56) References Cited

U.S. PATENT DOCUMENTS

| | | | |
|---|---|---|---|
| 7,568,203 B2 | 7/2009 | Dotan et al. | |
| 2005/0102608 A1* | 5/2005 | Batres | 715/505 |
| 2006/0279769 A1* | 12/2006 | Ludwig et al. | 358/1.15 |
| 2007/0089053 A1* | 4/2007 | Uhlig et al. | 715/513 |
| 2007/0191002 A1 | 8/2007 | Ge et al. | |
| 2009/0109978 A1 | 4/2009 | Zhu et al. | |
| 2010/0172680 A1* | 7/2010 | Butcher | 400/76 |

OTHER PUBLICATIONS

'RESTful webservices in ABAP using a generic controller'[online] SAP Network Blog, 2009 [retrieved on May 26, 2010]. Retrieved from the Internet: <URL: http://weblogs.sdn.sap.com/pub/w1g/14592>.
'Understanding Mobile Printing Technology and Capabilities' [online]. ZIH Corporation, 2007 [retrieved on May 26, 2010]. Retrieved from the Internet: <URL: http://www.zebra.com/id/zebra/na/en/documentlibrary/whitepapers/understanding_mobile.Download.File.File.tmp/WP13269_MobilePrintingTechR2.pdf?dvar1=White%20Paper&dvar2=Understanding%20Mobile%20Printing%20Technology%20and%20Capabilities>.
'The Keyboard Wedge Interface' [online]. Custom Sensors, Inc. 2000 [retrieved on May 26, 2010]. Retrieved from the Internet: <URL: http://web.archive.org/web/20080705093639/http:/www.csensors.com/kbdwedge.html>.
'Part 2—The Rest of the Story' [online]. Custom Sensors, Inc. 2000 [retrieved on May 26, 2010]. Retrieved from the Internet: <URL: http://web.archive.org/web/20080320040458/http:/www.csensors.com/kbdwedge2.html>.
Guinard and Trifa, "Towards the Web of Things: Web Mashups for Embedded Devices," *WWW 2009*, Apr. 20-24, 2009, Madrid Spain, 8 pages.
'Serial Peripheral Interface Bus' [online]. Wikipedia, 2008, [retrieved on Mar. 2, 2010]. Retrieved from the Internet: <URL:http://web.archive.org/web/20080208193159/http:/en.wikipedia.org/wiki/Serial_Peripheral_Interface_Bus>. 8 pages.

(Continued)

*Primary Examiner* — King Poon
*Assistant Examiner* — Vincent Peren
(74) *Attorney, Agent, or Firm* — Fish & Richardson P.C.

(57) ABSTRACT

A computer-implemented method and system for printing electronic documents. The method includes receiving a printing request from an application executed on the mobile device, via a socket connection conforming to a standard network communications protocol, the printing request generated from a print preview by the application. The method includes retrieving application data from the printing request. The method includes populating a print template with the retrieved application data, the print template including application data placeholders and print commands, the print commands being in a language of a printer device connected to the mobile device, wherein the retrieved application data replaces the application data placeholders. The method includes forwarding the populated print template to the printer device, the print commands instructing the printer device to print a document where the application data is presented according to the print template.

16 Claims, 5 Drawing Sheets

OTHER PUBLICATIONS

'Bluetooth' [online] Wikipedia, 2008, [retrieved on Mar. 2, 2010]. Retrieved from the Internet: <URL:http://web.archive.org/web/20080414072302/http:/en.wikipedia.org/wiki/Bluetooth: >, 13 pages.

'The Proof-of-concept Miniweb TCP/IP Stack' [online]. Miniweb, 2005, [retrieved on Jan. 13, 2010]. Retrieved from the Internet: <URL: https://www.sics.se/~adam/miniweb/>, 3 pages.

'ActiveX' [online]. Wikipedia, 2007, [retrieved on Jan. 13, 2010]. Retrieved from the Internet: <URL: http://web.archive.org/web/20071130135420/http:/en.wikipedia.org/wiki/Activex>, 3 pages.

'ActiveX' [online]. Wikipedia, 2010, [retrieved on Jan. 13, 2010]. Retrieved from the Internet: <URL: http://en.wikipedia.org/wiki/ActiveX#History>, 4 pages.

'iPic Web Server Aims to make Toaster-Net a Reality' [online]. Serverwatch.com, 1999, [retrieved on Jan. 13, 2010]. Retrieved from the Internet: <URL: http://www.serverwatch.com/news/article.php/1399091/iPic-Web-Server-Aims-to-Make-Toaster-Net-a-Reality.htm>, 3 pages.

'ITSmobile Services' [online] SAP, 2004, [retrieved on Jan. 12, 2010]. Retrieved from the Internet: <URL: http://help.sap.com/saphelp_nw04/helpdata/en/46/6c394e41496a58e10000000a11466f/con>, 1 page.

'Managed, Unmanaged, Native: What Kind of Code is This?' [online]. Developer.com, 2003, [retrieved on Jan. 13, 2010]. Retrieved from the Internet: <URL: http://www.developer.com/net/cplus/print.php/2197621>, 3 pages.

'PIOS API Core (SAP Library Peripheral Input Output Services Architecture)' [online]. SAP Collaboration Workspace, 2008, [retrieved on Jan. 13, 2010]. Retrieved from the Internet: <URL: https://cw.sdn.sap.com/cw/docs/DOC-31139>, 3 pages.

SAP, "SAP NetWeaver Mobile 7.1: Frequently Asked Questions," Jun. 2009, 59 pages.

'SAP NetWeaver'04: Mobile Infrastructure 2.5' [online]. SAP, 2004, [retrieved on Jan. 13, 2010]. Retrieved from the Internet: <URL: http://www.sdn.sap.com/irj/scn/go/portal/prtroot/docs/library/uuid/78a5ec90-0201-0010-ddb0-a8e4cb4593b2?QuickLink=index&overridelayout=true>, 34 pages.

'SAP NetWeaver 2004 SPS23; Its Mobile' [online]. SAP, 2004, [retrieved on Jan. 13, 2010]. Retrieved from the Internet: <URL: http://help.sap.com/saphelp_nw04/helpdata/en/47/b2c674f1f33b8be10000000 a421937/frameset.htm>, 2 pages.

* cited by examiner

| | sub 302a | Quantity 302b | Qty 302c | |
|---|---|---|---|---|
| 302 | | | | |
| 304 | tag | <td> 304b | 17 304c | |
| 306 | tag 306a | <td> 306b | $$payment_type$$ 306c | 3 306d |
| 308 | tag | <td> | 23 | |
| 310 | tag | <td> | 45 | |
| 312 | pos 312a | 190 312b | 98 312c | 10 312d |
| 314 | pos | 302 | 121 | |

MOBILE PRINTING SOLUTION

BACKGROUND

Printer devices are implemented to work with one or more printing languages. The printing languages specify the format and structure of the commands to send for instructing the printer devices to print the electronic documents in a particular way to achieve a particular informative and/or aesthetic result. Applications running on a mobile computer device can communicate with printer devices directly, requiring that the applications are configured to communicate with each of the different printer devices in their respective printing languages. Printing languages are not standardized and it may become costly for an application to support all commands, features, and functions of each and every printing language. A solution may be to configure an application to support only the most commonly used features. Such a solution may reduce the number of printing features available to the application or otherwise reduce the printer device's printing capabilities. Another solution is to provide one or more printer drivers that communicate with the applications. However, because the printer drivers produce output in graphical (e.g., pixel) mode, such a solution is printed very slowly and may reduce mobile printer utilization.

SUMMARY

The invention relates to printing an electronic document on a printing device.

In a first aspect, computer-implemented method for printing an electronic document on a printing device from a mobile device includes receiving a printing request from an application executed on the mobile device, via a socket connection conforming to a standard network communications protocol, the printing request generated from a print preview by the application. The method includes retrieving application data from the printing request. The method includes populating a print template with the retrieved application data, the print template including application data placeholders and print commands, the print commands being in a language of a printer device connected to the mobile device, wherein the retrieved application data replaces the application data placeholders. The method includes forwarding the populated print template to the printer device, the print commands instructing the printer device to print a document where the application data is presented according to the print template.

Implementations can include any, all or none of the following features. The print preview can include at least one of an HTML preview, an XHTML preview, or a plain text preview. The method can further include accessing a print configuration file and the application data is retrieved based on at least one rule in the print configuration file. The rule can specify a tag including at least one character and a number of characters to be retrieved from the printing request, the tag indicating the beginning of the number of characters to be retrieved when the tag is present in the printing request. The method can further include identifying the tag in the printing request and retrieving the number of characters from the printing request. The rule can specify an absolute position within the printing request and a number of characters to be retrieved from the printing request. The method can further include accessing the printing request at the absolute position and retrieving the number of characters from the printing request. The method can further include determining that a first character string specified in at least one rule is present in the printing request and replacing the first character string with an alternative character string specified by the rule. The method can further include modifying at least one script used by the application to communicate with the printer device to generate the printing request, the script including print commands in a language of the printer device connected to the mobile device, and modifying the script can include replacing the print commands with at least one of HTML commands or XHTML commands. The method can further include receiving at least one printer message from the printing device and performing at least (i) an update of internal statistics tables or (ii) transmission of a status message to the application, the update or the transmission corresponding to the printer message.

In a second aspect, a computer program product tangibly embodied in an information carrier and includes instructions that when executed by a processor perform a method for printing an electronic document on a printing device from a mobile device. The method includes receiving a printing request from an application executed on the mobile device, via a socket connection conforming to a standard network communications protocol, the printing request generated from a print preview by the application. The method includes retrieving application data from the printing request. The method includes populating a print template with the retrieved application data, the print template including application data placeholders and print commands, the print commands being in a language of a printer device connected to the mobile device, wherein the retrieved application data replaces the application data placeholders. The method includes forwarding the populated print template to the printer device, the print commands instructing the printer device to print a document where the application data is presented according to the print template.

In a third aspect, a system includes a mobile computer device including a mobile peripherals management module and at least one application, the application being configured to initiate a printing request via a socket connection conforming to a standard network communications protocol and corresponding to a print preview, and the mobile peripherals management module being configured to receive the printing request, retrieve application data from the printing request, and populate a print template with the retrieved application data. The system includes a printer device connected to the mobile computer device and configured to print a document where the application data is presented according to the print template forwarded to the mobile printer device by the mobile peripherals management module. The print template includes application data placeholders and print commands, the print commands being in a language of the printer device connected to the mobile device, wherein the retrieved application data replaces the application data placeholders and the application and the mobile peripherals manager are implemented in a computer program product and are stored on a computer readable medium connected to the mobile computer device.

Implementations can include any, all or none of the following features. The print preview can include at least one of an HTML preview, an XHTML preview, or a plain text preview. The mobile peripherals management module can access a print configuration file stored on the computer readable medium and the application data can be retrieved based on at least one rule in the print configuration file. The rule can specify a tag comprising at least one character and a number of characters to be retrieved from the printing request and the tag can indicate the beginning of the number of characters to be retrieved when the tag is present in the printing request. The mobile peripherals management module can identify the tag in the printing request and retrieve the number of characters from the printing request. The rule can specify an absolute position within the printing request and a number of characters to be retrieved from the printing request. The mobile peripherals management module can access the printing request at the absolute position and retrieve the number of characters from the printing request. The peripherals management module can determine that a first character string in at least one rule is present in the printing request and replace the first character string with an alternative character string specified by the rule. The mobile peripherals management module can receive at least one printer message from the printing device and perform at least (i) an update of internal statistics tables or (ii) transmission of a status message to the application, the update or the transmission corresponding to the printer message.

Implementations can provide any, all or none of the following advantages: providing improved utilization of a printer device's capabilities; providing a reduction in time to market for application vendors; and providing a reduction in development and maintenance costs for application and enterprise system vendors.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
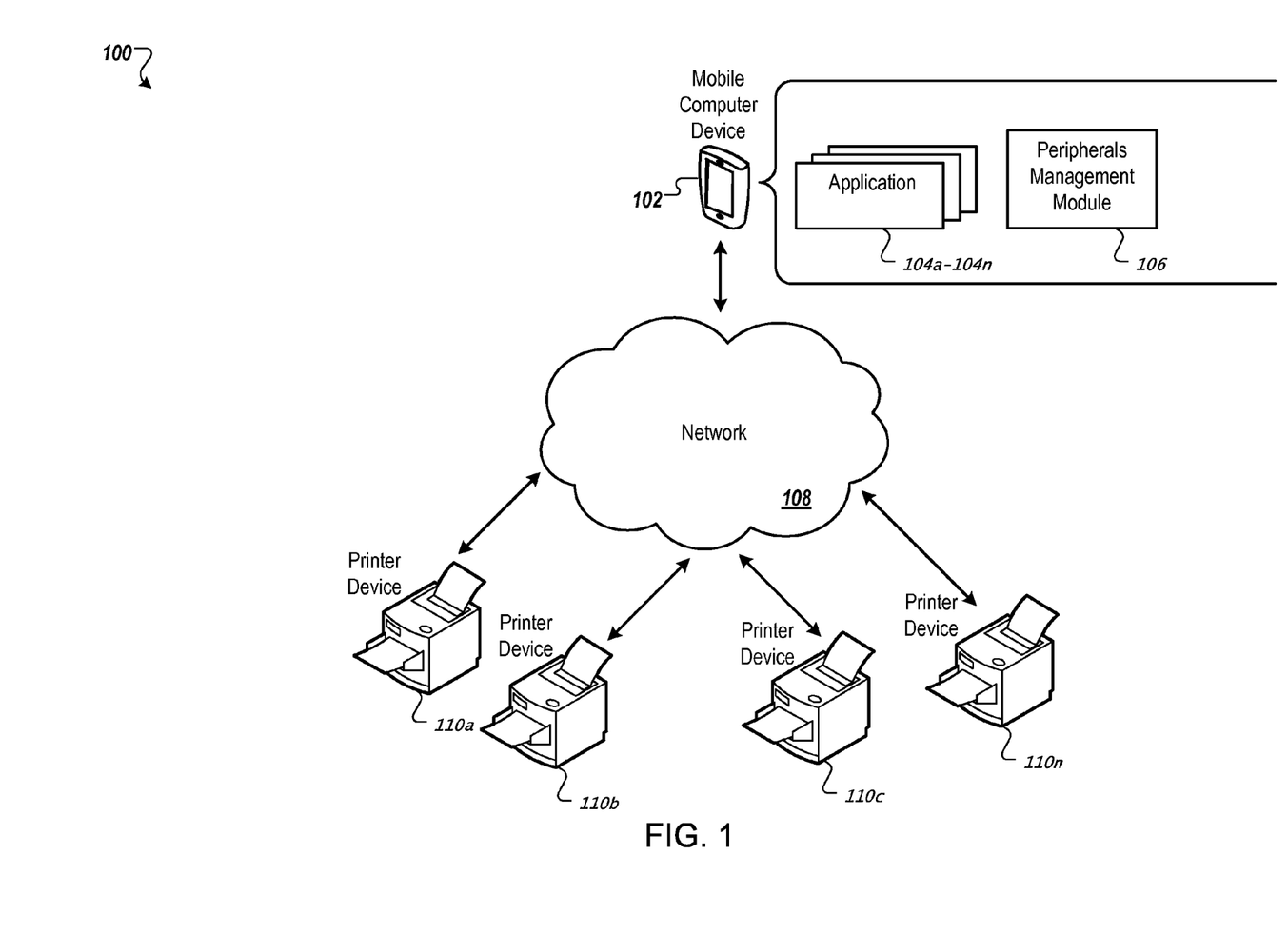
FIG. 1 shows an example system that can be used to print electronic documents on a printer device from a mobile device.

FIG. 1 shows an example system 100 that can be used to print electronic documents on any or all of printer devices 110a-110n from a mobile device 102. As a specific example, the system 100 can be used to print invoices or other electronic documents (which for brevity will simply be referred to as a document) created in the course of a business workflow. For example, the mobile device 102 can generate an invoice after a sale is transacted or the user of the system 100 has performed a service, and the invoice can be printed for delivery to the customer. Below will be described examples of how code from a print preview of a document can be combined with a predefined template for convenient document printing.

The system 100 includes one or more mobile computer devices 102, a network 108, and any number of printer devices 110a-110n. The mobile computer device 102 includes one or more applications 104a-104n that can be executed on the mobile computer device 102. The mobile computer device 102 also includes a peripherals management module 106.

The applications 104a-104n can be implemented in any of various computer program languages and stored as a computer program on computer readable medium connected to the mobile computer device. For example, applications 104a-104n can be implemented using Microsoft .NET (developed by Microsoft Corp.), C++ language, Java (developed by Sun Microsystems), or other programming languages. In some implementations, any of the applications 104a-104n can be a web browser application. In such implementations, the application logic can reside on the mobile computer device 102 or a remote web server, to name two examples. The applications 104a-104n can be used to automate one or more business workflows. For example, applications 104a-104n can include an invoice application, a sales quote application, an order processing application, an inventory management application, other applications, or combinations thereof (e.g., an order processing and invoicing application).

In general, a user can interact with any of the applications 104a-104n by providing the applications 104a-104n with user input. For example, user input can be provided by a stylus or a touchscreen to select data fields in the application. As another example, user input can be provided by a keyboard or touchscreen to input values into the selected fields. Other user input can also be provided to the any of the applications 104a-104n.

The peripherals management module 106 can facilitate communication between the mobile device 102 and any of the printers 110a-110n. For example, the peripherals management module 106 receives printing information from any of the applications 104a-104n and forwards printing instructions to any of the printer devices 110a-110n. In some implementations, the peripherals management module 106 forwards the information to a printer according to user selection. For example, the user of an application 104a-104n can select any of printer devices 110a-110n to print from by selecting one of the printer devices 110a-110n in a user interface of the applications 104a-104n.

In some implementations, the selection of the printer can be performed automatically or semi-automatically. For example, if only one of the printer devices 110a-110n is connected to the mobile computer device 102, the connected printer device 110a-110n can be automatically selected by the peripherals management module 106. In some implementations, the selection can be performed according to the properties associated with the content to be printed or other properties. For example, if a document to be printed includes one or more colors, the printer devices 110a-110n that include color printing capabilities can be prioritized in a user interface of the applications 104a-104n. As another example, the selection of the printer device 110a-110n can be performed based on the proximity of the printer device 110a-110n to the mobile computer device 102 whereby the nearest printer device 110a-110n is automatically selected. Additional examples of the peripherals management module 106 are described below.

In some implementations, the network 108 is implemented using wireless connections such as a Bluetooth connection or a wireless Ethernet connection between the mobile computing device and any of the printer devices 110a-110n. The network 108 can include any network that facilitates communications between the mobile computer device 102 and any of the printer devices 110a-110n. Examples include, but are not limited to, local area networks (LANs) and wide area networks (WANs) such as intranets, and the Internet, respectively. In some implementations, the network 108 is implemented using wired connections such as a universal serial bus (USB) connection, a serial connect (e.g., a RS-232 connection), or a wired Ethernet connection between the mobile computer device 102 and any of the printer devices 110a-110n.

The printer devices 110a-110n can be any type of printer device, for example a commercially available printer. The printer devices 110a-110n receive information provided by the mobile computer device 102 (e.g., sent from the peripherals management module 106) and print out a corresponding representation based on the information. For example, any of the printer devices 110a-110n receives information corresponding to an invoice document that the user of the mobile computer device 102 generates using one of the applications 104a-104n, and prints a representation of the invoice document. In some implementations, at least one printer device 110a-110n is a mobile printer device. For example, any of printer devices 110a-110n can be mounted on a vehicle or worn by the user of the computer device 102. Other mobile implementations are also possible.

In some implementations, one or more of the printer devices 110a-110n has its own printing language. As such, the peripherals management module 106 can bridge any differences in compatibility between the printer devices 110a-110n from the applications 104a-104n. That is, the applications 104a-104n do not need to be configured to directly communicate with any of the printer devices 110a-110n, and therefore do not need to be configured according to their respective printing languages. Instead, the applications 104a-104n can be configured to communicate with the peripherals management module 106 in a generic fashion and the peripherals management module 106 can facilitate communications with the printer devices 110a-110n. For example, if the applications 104a-104n were originally configured to generate printed documents using one or more scripts, the scripts can be modified for the application to communicate with the peripherals management module 106. Moreover, because the peripherals management module 106 is configured to communicate with each of the printing devices in their respective printing languages, the peripherals management module 106 can better leverage the capabilities of each printer device 110a-110n.

Figure 2:
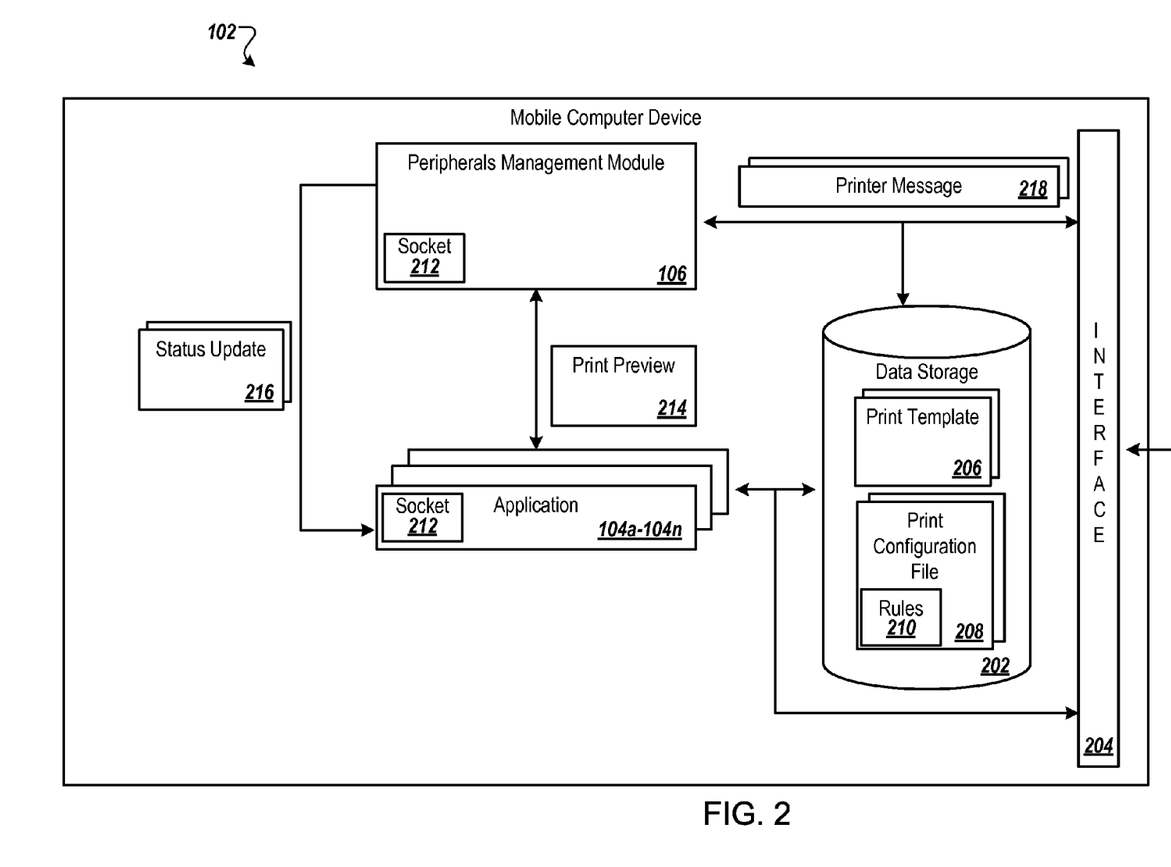
FIG. 2 shows an example mobile computer device.

FIG. 2 shows an example mobile computer device 102. In general, the mobile computing device 102 can be a personal digital assistant (PDA), smartphone, hand-held computer, laptop computer, tablet-PC, or any other mobile device that includes at least one application 104a-104n, a peripherals management module 106, a data storage 202, and an interface 204. In some implementations, the mobile computer device 102 can also be a desktop computer, e.g., where printing from a desktop computer to a mobile printer or label printer is required.

The applications 104a-104n can communicate with the mobile peripherals management module 106 using socket based communication utilizing at least one socket 212. For example, the peripherals management module 106 can listen (e.g., be creating a socket listener object) to the socket 212 for any data being provided thereby. The socket 212 can be implemented, for example, as any of a datagram socket (e.g., using the user datagram protocol (UDP)), a stream socket (e.g., using the transmission control protocol (TCP)), a raw socket or any other standard network communications protocol (e.g., XML-RPC).

In general, the socket based communication corresponds to a print preview 214 generated by the applications 104a-104n. That is, in some implementations, the socket based communication initiated by the applications 104a-104n that includes a printing request in a socket stream that corresponds to a print preview 214. For example, any of the applications 104a-104n can generate a print preview screen to illustrate the contents and/or layout of the document, initiate a socket connection using socket 212, and provide a printing requesting in a socket stream that corresponds to the generated print preview. The code used to generate the preview 214 can then be used as a print instruction to the peripherals management module 106.

In some implementations, the applications 104a-104n are developed and coded to have the functionality of generating the print preview 214. In other implementations, the applications 104a-104n are formed by modifying one or more existing applications. For example, if such existing applications generate a printed document using one or more scripts (e.g., in a scripting language), the scripts can be modified to remove any particular printer specific commands (e.g., codes in a particular printing language) and replaced with generic commands. In some implementations, the commands may include HTML commands, XHMTL commands, or other commands. In such implementations, the HTML commands or XHTML commands are generally referred to as HTML tags and XHTML tags, respectively, and can be used as commands because the tags may indicate to the peripherals management module 106 that a certain printing behavior is requested (e.g., a change in font style, including a particular graphic, or other printing behavior). In some implementations, the mobile peripherals management module 106 may enrich the contents of the received print preview 214 using some combination of the print template 206 and the print configuration file 210, which are described in more detail below.

In addition, the print preview 214 need not be a preview in a traditional sense (e.g., presented on the display device of the mobile computing device 102 prior to printing). That is, in some implementations, the print preview 214 is not previewed or otherwise presented to a user before being provided to the peripherals management module 106. As such, when a user selects a document for printing, the applications 104a-104n may automatically generate and provide the print preview 214 to the peripherals management module 106 without further user input.

In some implementations, the peripherals management module 106 may listen to the socket 212 using a hypertext transfer protocol (HTTP) daemon. That is, in some implementations, the socket communication is performed using an HTTP socket. For example, an invoice application can send a print request to the peripherals management module 106 using an HTTP command similar to:

```
POST /printer HTTP/1.1
Host: localhost
User-Agent: Mozilla/4.0
Content-Length: 384
Content-Type: text/html; charset=UTF-8
<Invoice as XHTML>
```

Here, <Invoice as XHTML> specifies an HTML print preview of the invoice document generated by one of the applications 104a-104n. Other file names can be used to designate the print preview in particular implementations. The print preview information can include text/image content for the document, as well as layout information for the document. In some implementations, the print preview 214 (e.g., an HTML print preview) can include formatting information, including text alignment (e.g., left, right, and center), tables, font size (e.g., 8 point font, 12 point font, and other font sizes), and font style (e.g., bold, italics, underlined, and other font styles), to name a few examples.

The peripherals management module 106 receives the printing request (e.g., the POST request) via a socket based communication corresponding to the print preview 214 and can populate one or more print templates 206 according to the print preview 214. In general, each of the print templates 206 specifies how a specific document should be printed. For example, each of the print templates 206 can include printer codes in a particular printing language and data placeholders corresponding to data that should be printed. That is, the print codes provide instructions to the printer devices 110a-110n specifying how to present the data from the socket based communication in a specific layout according to the particular printing language.

The data placeholders in the print templates 206 represent document-specific variable data. For example, in an invoice, the data placeholders can represent data which are usually different for each invoice (unlike, e.g., company address or other data that is the same for every invoice). That is, when the print template is configured for an invoice, the data placeholders can correspond to invoice-specific information such as customer name, shipping address and the purchased item(s), to name a few examples.

In some implementations, the print templates 206 also include predefined information portions to be included in the document. For example, print templates 206 can include a corporate logo, corporate information, signature blocks, or other predefined information portions that should appear on each document printed using that template. In some implementations, the printer templates 206 are generated using an application that graphically represents the placement of data elements within the document and generates the appropriate printer codes, data placeholders, and predefined information portions.

In some implementations, the peripherals management module 106 uses rules 210 located in at least one print configuration file 208 to retrieve data from the print preview 214 and associate the data with particular data placeholders. For example, the rules can specify start and stop delimiters of data in the print preview 214, absolute positions of data in the print preview 214 and other techniques for retrieving data from the print preview 214 based on the data content of the socket based communication. Examples of the rules 210 are described below.

Furthermore, in some implementations, the peripherals management module 106 can receive one or more printer messages 218 from any of the printer devices 110a-110n. In response, the peripherals management module 106 can log any of the printer messages 218 in one or more status logs. For example, the peripherals management module 106 can update one or more internal statistic tables that can be used to log the number of printing request (e.g., per day, per week, per month, and the like), the number of successfully completed print jobs, the number of failed print jobs, and received printing error codes, to name a few examples. In addition, the peripherals management module 106 can forward one or more status updates 216 corresponding to any of the printer message 218 to any of the applications 104a-104n. In such implementations, the applications 104a-104n can generate a user interface that presents a user message corresponding to the contents of any of the status updates 216. For example, any of the applications 104a-104n can present the user with a message if any of the printer devices 110a-110n fail to print a requested document, successfully print the requested document, experience a paper jam, have a low battery level, or for other reasons.

The data storage 202 can be any type of computer-readable storage including, but not limited to, a hard drive, memory (e.g., read-only memory (ROM), random access memory (RAM), or other memory), or any other computer-readable storage. In some implementations, the data storage can be used to store any number of print templates 206 and print configuration files 208.

The interface 204 can be implemented in software (e.g., a communication protocol), hardware (e.g., an Ethernet card), or combinations of these. The interface 204 allows the mobile computer device 102 to communicate with other devices, such as any of the printer devices 110a-110n. That is, in some implementations, the interface 204 can send one or more populated print templates 206 generated by the peripherals management module 106 to the printer devices 110a-110n and receive one or more printer messages 218 from the printer devices 110a-110n.

Figure 3:
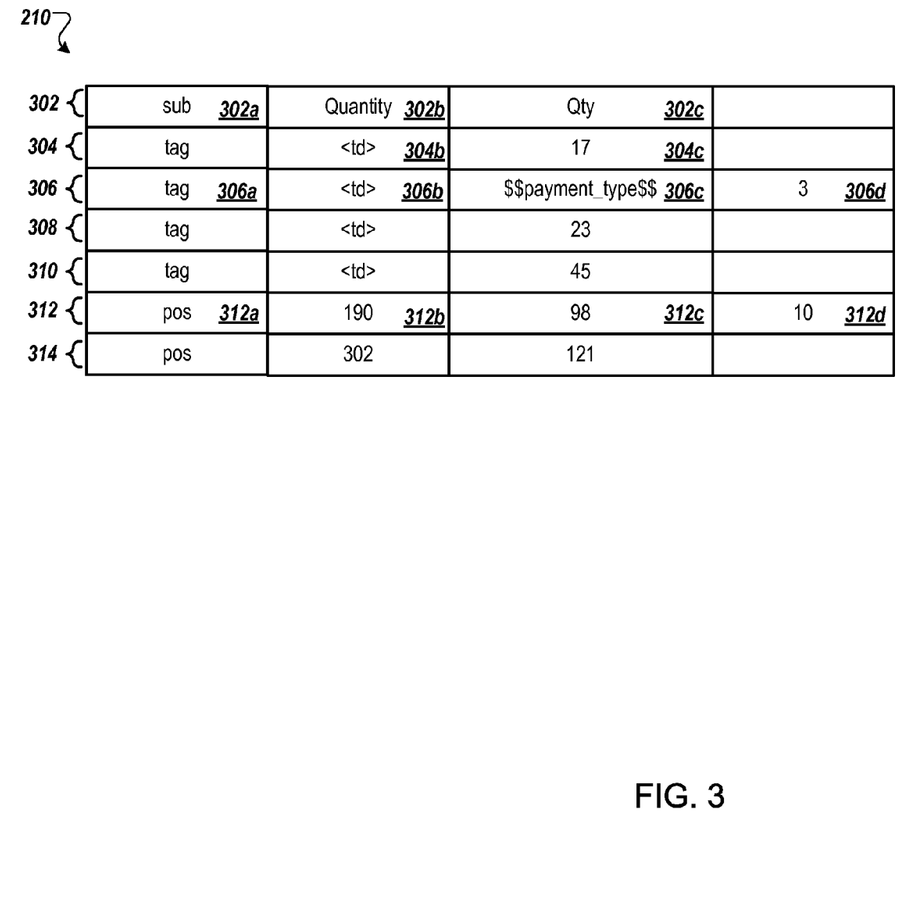
FIG. 3 shows an example collection of rules located in a printer configuration file for printing electronic documents.

FIG. 3 shows an example collection of rules 210 located in a printer configuration file for printing electronic documents. For simplicity, a small number of rules 302-314 are here illustrated, but the printer configuration file 208 can include any number of rules. Each of the rules 302-314 can be used by the peripherals management module 106 to retrieve data from the print preview 214 included in the printing request. For example, rule 306 specifies a delimiter rule and rule 312 specifies an absolute position rule. The peripherals management module 106 can use rule 306 and rule 312, as an example, to retrieve data from the printing request according to a delimiter and an absolute position in the printing request, respectively. In some implementations, a delimiter specifies one or more start characters in the printing request, but may also refer to one or more stop characters in the printing request. That is, when the peripherals management module 106 identifies the start or stop characters, it can perform an action according to additional parameters included in the rule.

In some implementations, the peripherals management module 106 can reference an absolute position (e.g., memory address 306) in the printing request to retrieve a number of characters from the printing request. In some implementations, the collection of rules 210 can also include rules for modifying data retrieved from the printing request (e.g., the printing request). For example, rule 302 specifies a substitution rule, which can be used by the peripherals management module 106 to modify one or more values in the populated print template or the printing request.

The rule 302 includes a rule instruction 302a, a first rule parameter 302b and a second rule parameter 302c. In the example rule 302, the rule instruction 302a is a "sub" instruction. The "sub" rule instruction 302a can instruct the peripherals management module 106 to apply a substitution operation to the printing request or the populated printer template, according to the first rule parameter 302b and the second rule parameter 302c. For example, the peripherals management module 106 can identify the first rule parameter 302b (e.g., character string "Quantity") in either the printing request or the populated print template and replace it with the second rule parameter 302c (e.g., character string "Qty"). That is, the peripherals management module 106 can apply rule 302 to replace a first character string (e.g., represented by the first rule parameter 302b) with an alternative character string (e.g., represented by the second rule parameter 302c) using any number of conventional character matching and replacement techniques, including regular expression matching, to name one example The rule 306 includes a rule instruction 306a, a first rule parameter 306b, a second rule parameter 306c, and a third rule parameter 306d. In the example rule 306, the rule instruction 306a is a "tag" instruction. The "tag" rule instruction 306a can instruct the peripherals management module 106 to identify a tag specified by the rule 306 in the printing request and retrieve a number of characters from the printing request according to rule parameters 306d and insert the retrieved characters into the print template according to rule parameter 306c.

For example, the peripherals management module 106 can identify the first rule parameter 306b (e.g., character string "<td>") in the printing request. In some implementations, the first rule parameter 306b is identified using a parsing technique. Then, the peripherals management module 106 can retrieve 3 characters from the printing request, as specified by the third rule parameter 306d. For example, the peripherals management module 106 can access the printing request at a location in memory corresponding to the location of the identified first rule parameter 306b and retrieve 3 characters from that position in the printing request.

If, for example, the first rule parameter 306b represents a start delimiter, the peripherals management module 106 can retrieve the 3 characters after the identified first rule parameter 306b in the printing request. Conversely, for example, if the first rule parameter 306b represents a stop delimiter, the peripherals management module 106 can retrieve the 3 characters before the identified first rule parameter 306b in the printing request. Then, the peripherals management module 106 can replace portions of the print template 206 as specified by the second rule parameter 306c with the retrieved characters. For example, the peripherals management module 106 can use a parsing technique to identify an application data placeholder "$$payment_type$$"" in the print template 206 and replace the application data placeholder with the 3 retrieved characters from the printing request.

In some implementations, as is illustrated by a comparison between rules 304 and 306, the second rule parameter 304c specifies an absolute position in the print template 206 instead of an application data placeholder (e.g., as specified by the second rule parameter 306c). In addition, in some implementations, the third rule parameter 306d can be an optional parameter. If, for example, the peripherals management module 106 processes rule 304, the number of characters retrieved can be determined according to the location of the delimiters 304b and 306b and/or whitespace characters in the printing request. Furthermore, the number of characters retrieved can be inserted in the print template 206 at a location specified by the second rule parameter 304c. That is, if, for example, there are 2 characters between the first delimiter 304b and the second delimiter 306b (or a whitespace character, e.g., a space) in the printing request, the peripherals management module 106 can retrieve those 2 characters and insert them in the print template 206 at absolute position 17, as specified by second rule parameter 304c.

Accordingly, any of the rules 302-314 can be used to retrieve data from the printing request. For example, rule 312 can instruct the peripherals management module 106 to access an absolute position in the printing request (e.g., the position in memory specified by the first rule parameter 312b) and retrieve 10 characters of data according to the third rule parameter 312d and insert the retrieved characters at absolute position 98 in the print template 206 as specified by the second rule parameter 312c.

In some implementations, the peripherals management module 106 can apply the rules a different number of times depending on the rule applied. For example, in some implementations, rule 302 can be applied any number of times the peripherals management module 106 encounters the character string "Quantity.". As another example, in some implementations, the peripherals management module 106 can apply each of the rules 304-314 a pre-determined number of times (e.g., once) according to their respective ordering in the collection of rules 210. Also, in some implementations, the collection of rules 210 can include rules conforming to regular expressions. For example, a rule that replaces capital letters with corresponding lower case letters in the printing request can be defined using a rule instruction of "sub," a first rule parameter of "[A-Z]*" and a second rule parameter of "[a-z]*."

Figure 4:
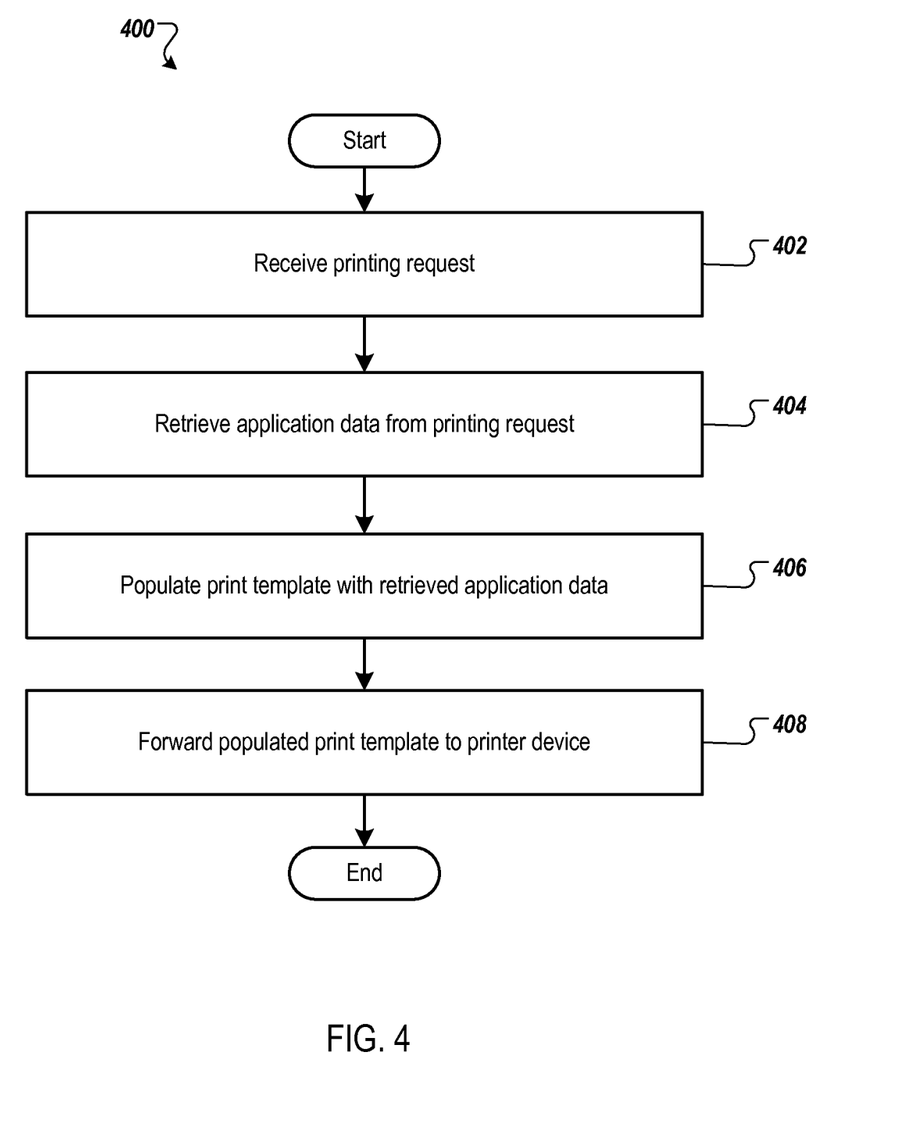
FIG. 4 shows an example technique that can be used to print an electronic document on a printing device from a mobile device.

FIG. 4 shows an example technique 400 that can be used to print an electronic document on a printing device from a mobile device. The technique 400 can be performed by a processor executing instructions from a computer-readable medium, for example in the mobile device 102. For illustrative purposes, the technique 400 is described in reference to FIGS. 1-3, but the technique 400 is not limited to those elements depicted in FIGS. 1-3.

In step 402, a printing request is received from an application executed on a mobile device, via a socket connection conforming to a standard network communications protocol, the printing request corresponding to a print preview by the application. For example, the peripherals management module 106 can receive a print preview corresponding to the print preview 214 from one of the applications 104a-104n using socket 212.

In step 404, application data from the printing request is retrieved the printing request. For example, peripherals management module 106 can retrieve data from the print preview 214 using one or more rules 210. In some implementations, the peripherals management module 106 may ignore print or display instructions included therein. That is, the rules 210 can include one or more rules 302-314 that retrieve data from the print preview while not including rules that cause the peripherals management module 106 to retrieve print or display instructions from the print preview 214. In some implementations, the peripherals management module 106 can apply delimiter rules (e.g., delimiter rule 306), absolute position rules (e.g., rule 312), and substitution rules (e.g., rule 302) to the print preview 214, to name a few examples.

In step 406, a print template is populated with the retrieved application data, the print template including application data placeholders and print commands, the print commands being in a language of a printer device connected to the mobile device, wherein the retrieved application data replaces the application data placeholders. For example, the peripherals management module 106 can populate one of the print templates 206 that includes print commands for one of the printer devices 110a-110n. In addition, the peripherals management module 106 can use one or more rules 210 to associate the retrieved data with corresponding data placeholders in the print template 206.

In some implementations, the rules in the printing configuration file 208 can define how application data is associated with the application data placeholders in the printing template. For example, the association can be defined by absolute positions. One example of such an associated is illustrated by rule 312, whereby 10 characters (e.g., as specified by the third rule parameter 312d) are inserted from the position 190 of the printing request (e.g., as specified by the first rule parameter 312b), into the print template 206 starting from the position 98 in the print template 206 (e.g., as specified by the second rule parameter 312c). As another example, the association can be performed using a search and replace operation. One example of such an associated is illustrated by rule 306, whereby the application data placeholder "$$payment_type$$" (e.g., as specified by the second rule parameter 306b) in the print template 206, is replaced with 3 characters (e.g., as specified by the third rule parameter 306d) from the printing request which immediately follows the delimiter "<td>" (e.g., as specified by the first rule parameter 306b) in the printing request. Another example of such an associated is where the application data placeholder "$$QUANTITY" in the printing template can be replaced with a number of characters from the printing request which immediately follow the string "quantity," "Quantity," or "QUANTITY" in the printing request.

In step 408, the populated print template is forwarded to the printer device, the print commands instructing the printer device to print a document where the application data is presented according to the print template. For example, the peripherals management module 106 can forward the populated print template to any of the printer devices 110*a*-110*n* using interface 204.

Figure 5:
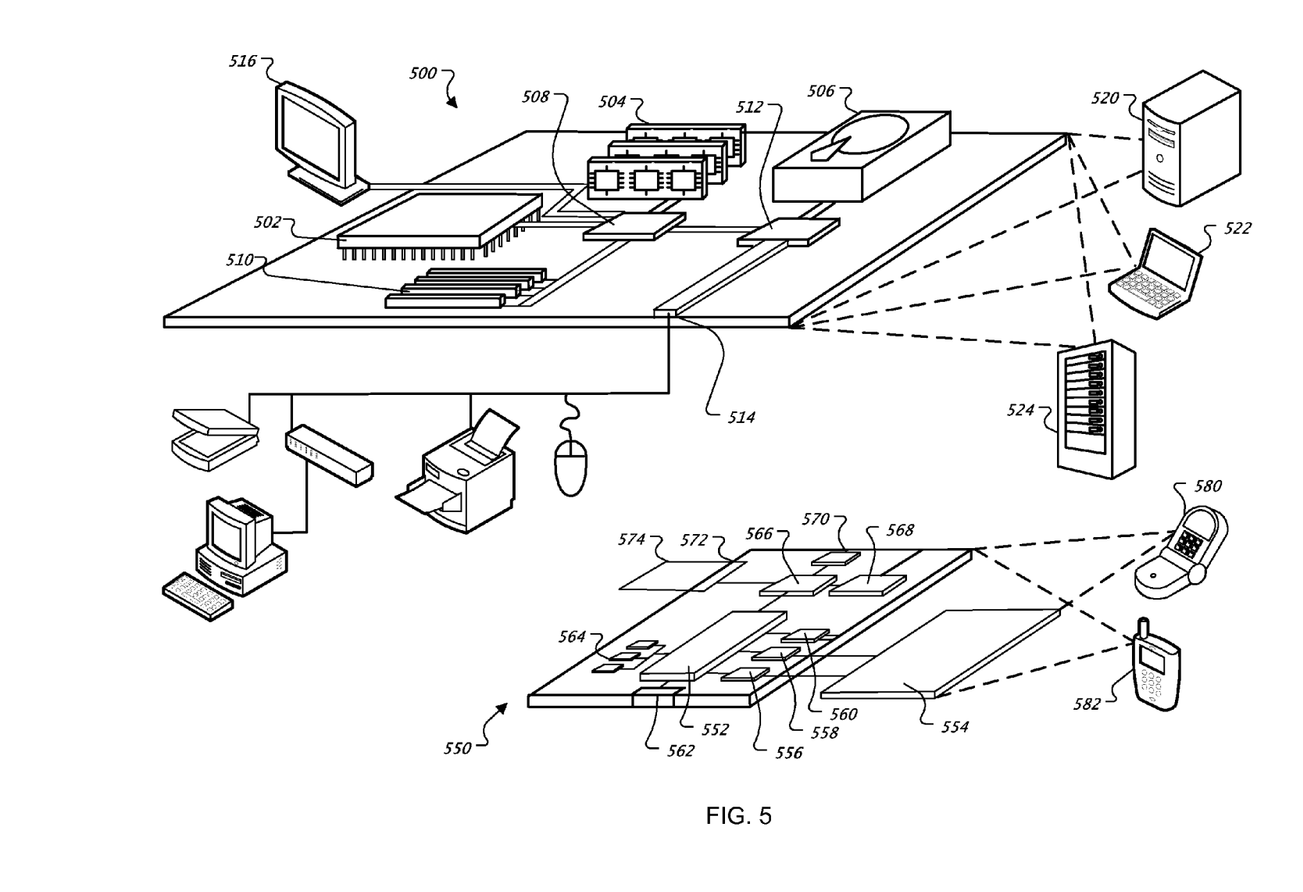
FIG. 5 is a block diagram of a computing system that can be used in connection with computer-implemented methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method for printing an electronic document on a printing device from a mobile device, the method comprising:
   receiving a printing request from an application executed on the mobile device, via a socket connection conforming to a standard network communications protocol, the printing request generated from a print preview by the application;
   accessing a print configuration file;
   retrieving application data from the printing request, wherein the application data is retrieved based on at least one rule in the print configuration file, wherein the rule specifies an absolute position within the printing request and a number of characters to be retrieved from the printing request;

populating a print template with the retrieved application data, the print template including application data placeholders and print commands, the print commands being in a language of a printer device connected to the mobile device, wherein the retrieved application data replaces the application data placeholders; and forwarding the populated print template to the printer device, the print commands instructing the printer device to print a document where the application data is presented according to the print template.

2. The computer-implemented method of claim 1, wherein the print preview includes at least one of an HTML preview, an XHTML preview, or a plain text preview.

3. The computer-implemented method of claim 1, wherein the rule specifies a tag comprising at least one character and a number of characters to be retrieved from the printing request, the tag indicating the beginning of the number of characters to be retrieved when the tag is present in the printing request.

4. The computer-implemented method of claim 3, further comprising:
identifying the tag in the printing request; and
retrieving the number of characters from the printing request.

5. The computer-implemented method of claim 1, further comprising:
accessing the printing request at the absolute position; and
retrieving the number of characters from the printing request.

6. The computer-implemented method of claim 1, further comprising:
determining that a first character string specified in at least one rule is present in the printing request; and
replacing the first character string with an alternative character string specified by the rule.

7. The computer-implemented method of claim 1, further comprising:
receiving at least one printer message from the printing device; and
performing at least (i) an update of internal statistics tables or (ii) transmission of a status message to the application, the update or the transmission corresponding to the printer message.

8. A system comprising:
a mobile computer device including a mobile peripherals management module and at least one application, the application being configured to initiate a printing request via a socket connection conforming to a standard network communications protocol and corresponding to a print preview, and the mobile peripherals management module being configured to receive the printing request, access a print configuration file, retrieve application data from the printing request, wherein the application data is retrieved based on at least one rule in the print configuration file, wherein the rule specifies an absolute position within the printing request and a number of characters to be retrieved from the printing request, and populate a print template with the retrieved application data; and
a printer device connected to the mobile computer device and configured to print a document where the application data is presented according to the print template forwarded to a mobile printer device by the mobile peripherals management module;
wherein the print template includes application data placeholders and print commands, the print commands being in a language of the printer device connected to the mobile device, wherein the retrieved application data replaces the application data placeholders and the application and the mobile peripherals manager are implemented in a computer program product and are stored on a computer readable medium connected to the mobile computer device.

9. The system of claim 8, wherein the print preview includes at least one of an HTML preview, an XHTML preview, or a plain text preview.

10. The system of claim 8, wherein the rule specifies a tag comprising at least one character and a number of characters to be retrieved from the printing request, the tag indicating the beginning of the number of characters to be retrieved when the tag is present in the printing request.

11. The system of claim 10, wherein the mobile peripherals management module is further configured to identify the tag in the printing request and retrieve the number of characters from the printing request.

12. The system of claim 8, wherein the mobile peripherals management module is further configured to access the printing request at the absolute position and retrieve the number of characters from the printing request.

13. The system of claim 8, wherein the peripherals management module is further configured to determine that a first character string in at least one rules is present in the printing request and replace the first character string with an alternative character string specified by the rule.

14. The system of claim 8, wherein the mobile peripherals management module is further configured to receive at least one printer message from the printing device and perform at least (i) an update of internal statistics tables or (ii) transmission of a status message to the application, the update or the transmission corresponding to the printer message.

15. A computer program product embodied in a non-transitory computer-readable storage medium and comprising instructions that when executed by a processor perform a method for printing an electronic document on a printing device from a mobile device, the method comprising:
receiving a printing request from an application executed on the mobile device, via a socket connection conforming to a standard network communications protocol, the printing request generated from a print preview by the application;
accessing a print configuration file;
retrieving application data from the printing request, wherein the application data is retrieved based on at least one rule in the print configuration file, wherein the rule specifies an absolute position within the printing request and a number of characters to be retrieved from the printing request;
populating a print template with the retrieved application data, the print template including application data placeholders and print commands, the print commands being in a language of a printer device connected to the mobile device, wherein the retrieved application data replaces the application data placeholders; and
forwarding the populated print template to the printer device, the print commands instructing the printer device to print a document where the application data is presented according to the print template.

16. A computer-implemented method for printing an electronic document on a printing device from a mobile device, the method comprising:
modifying at least one script used by an application executed on the mobile device to communicate with a printer device to generate a printing request, the script including print commands in a language of the printer device connected to the mobile device, and wherein modifying the script includes replacing the print commands with at least one of HTML commands or XHTML commands;

receiving the printing request from the application, via a socket connection conforming to a standard network communications protocol, the printing request generated from a print preview by the application;

retrieving application data from the printing request;

populating a print template with the retrieved application data, the print template including application data placeholders and the print commands, the print commands being in a language of a printer device connected to the mobile device, wherein the retrieved application data replaces the application data placeholders; and forwarding the populated print template to the printer device, the print commands instructing the printer device to print a document where the application data is presented according to the print template.

* * * * *